June 17, 1941.  W. H. GERBER  2,246,464
LUMINOUS SCALE ROTAMETER
Filed March 18, 1940
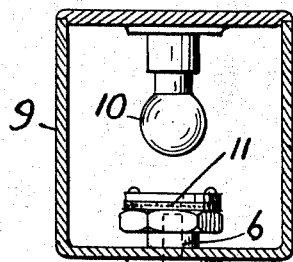
FIG. 1
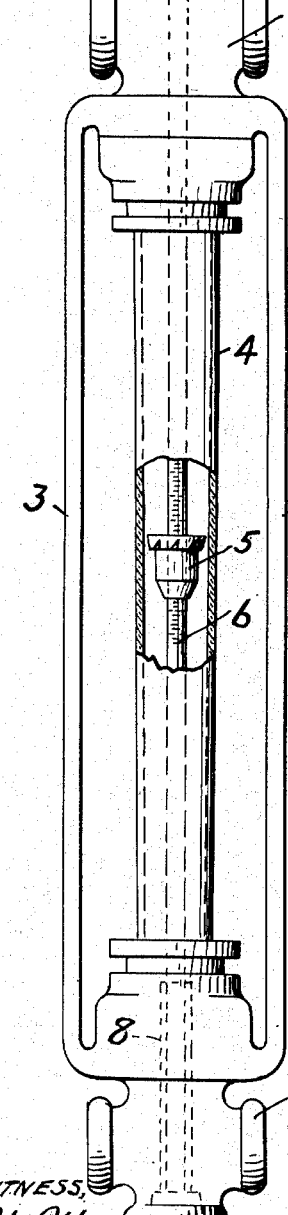
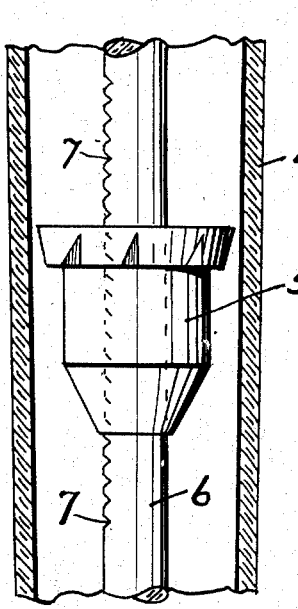
FIG. 2.
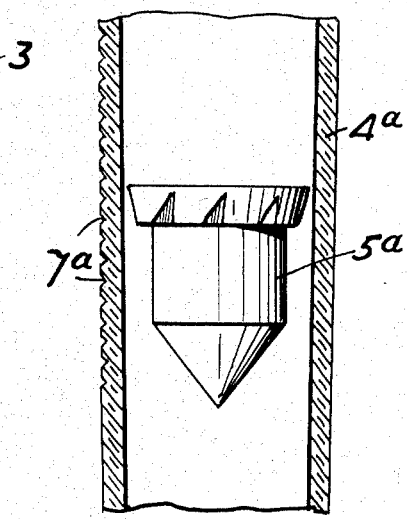
FIG. 4.
FIG. 3.
INVENTOR
Walter H. Gerber
BY
Augustus B. Stoughton
ATTORNEY.

Patented June 17, 1941

2,246,464

UNITED STATES PATENT OFFICE 2,246,464

LUMINOUS SCALE ROTAMETER

Walter H. Gerber, Philadelphia, Pa., assignor to Schutte & Koerting Company, Philadelphia, Pa., a corporation of Pennsylvania Application March 18, 1940, Serial No. 324,553

3 Claims. (Cl. 73—209)

The principal object of the present invention is to provide a rotameter which can be used satisfactorily in dark places such as occur in connection with photography, and which, when so used, does not give out objectionable light although it can be easily and accurately read in the dark.

Another object of the invention is to provide simple, reliable and efficient means for illuminating a gauge or measuring device of the rotameter without illuminating the space surrounding the instrument.

Other objects of the invention will appear from the following description at the end of which the invention will be claimed.

Generally stated, the invention comprises, means for edge-lighting at least one of the elements, which is transparent, of the measuring device or gauge of a rotameter.

The present application is directed to the use of the invention in dark places which are required to be kept dark by reason of requirements of the work or some of it that is done in them.

The invention also comprises the improvements to be presently described and finally claimed.

In the following description reference will be made to the accompanying drawing forming part hereof and in which:

Figure 1 is a front view with parts broken away of a rotameter embodying features of the invention.

Figure 2 is a sectional view drawn to an enlarged scale and showing parts of the device illustrated in Figure 1.

Figure 3 is a view similar to Figure 1 illustrating a modification of the invention, and Figure 4 is a sectional view drawn to an enlarged scale and illustrating parts shown in Figure 3.

Referring to Figures 1 and 2 and generally stated, the rotameter as a whole is of standard construction. 1 and 2 indicate the heads which are spaced apart by columns 3. Liquid to be measured enters and leaves at the heads and flows through the transparent tube 4. The position of the float 5 indicates the rate of flow. In connection with a standard rotameter such as has been briefly described, the description of the invention will be given. 6 is a pole rod and it passes through a suitable aperture in the float 5. One feature of the present invention is that the pole rod 6 is made of "Lucite" glass or any transparent material adapted for edge-lighting. On the pole rod 6 is a scale consisting of a number of indentations or scratches 7. The pole rod 6 is shown as mounted at the base of the instrument in a tube 8 which serves as a stop and at the top the pole rod 6 extends through the head 1 and up into a closed chamber 9. In the chamber 9 is a lamp or light 10 arranged opposite the end of the rod 6 and in a position to edge-light it.

By the described construction, and in accordance with the law of edge-lighting, the pole rod itself is very little, or not at all, illuminated but the indentations or scratches of the scale 7 are illuminated in such a way that they are readily seen. 11 indicates a light filter arranged at the end of the pole rod 6 and between it and the source of light 10. The scale or markings 7 should be at the back of the rod in respect to the eye of the observer, because in that way they are more pronounced. If the sides of the notches 7 are at 45°, light from the lamp 10 is directed horizontally which is something of an advantage but not in all cases necessary.

When in use, the observer notes a black line at the top and bottom of the float and he refers to the black line at the top of the float in its relation to the scale which is marked on the pole. Thus the rotameter includes a gauge or measuring device having the float as an index element and the marking on the pole rod as a scale element and, as has been said, the scale element is of transparent material and is edge-lighted so that its markings are illuminated while little or no other light is visible.

The construction and mode of operation of the modification shown in Figs. 3 and 4 are substantially as described except that the tube 4ª is of transparent material and has upon it the scale markings 7ª. This tube is edge-lighted by the source of light 10ª through a plane or light filter glass partition 11ª which also serves the purpose of excluding fluid or liquid, being measured, from the light source.

It will be obvious to those skilled in the art to which the invention relates that modifications may be made in details of construction and arrangement and in matters of mere form without departing from the spirit of the invention which is not limited in respect to such matters.

I claim:

1. Means for fitting rotameters having a float or rotor and a transparent metering tube for use in the dark comprising, a cylindrical pole rod of transparent material arranged in the metering tube and in respect to which the rotor is movable, a notched scale on the cylindrical surface of the rod, and a source of light arranged to edge-light the pole rod and illuminate the scale.

2. Means for fitting rotameters having a rotor and a transparent metering tube for use in the dark comprising, a pole rod cylindrical throughout its length and of transparent material arranged in the metering tube and having one of its ends protruding at the top of the rotameter, a chamber closed against the transmission of light arranged at the top of the rotameter and into which the end of the pole rod projects, and a lamp in said chamber opposed to the end of the pole rod.

3. In a rotameter having spaced heads provided with fluid ways by which the fluid to be measured enters and leaves the rotameter and having a rotor element, the combination of a chamber closed against the emission of light and mounted outside of the fluid way of one of the heads, a lamp in the chamber, a transparent partition separating a fluid way from the interior of the chamber and from the lamp, and a cylindrical scale element of transparent material extending between the heads and into the fluid way of one of them with its end confronting the lamp and having notches on its cylindrical surface which are to be edge lighted by the lamp.

WALTER H. GERBER.